(12) United States Patent
Yaniv

(10) Patent No.: US 6,977,628 B1
(45) Date of Patent: *Dec. 20, 2005

(54) METHOD AND APPARATUS FOR DYNAMICALLY PRESENTING A PICTORIAL REPRESENTATION

(76) Inventor: Zvi Yaniv, 5810 Long Ct., Austin, TX (US) 78730

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/241,515

(22) Filed: Feb. 1, 1999

(51) Int. Cl.[7] .............................................. G09G 5/00
(52) U.S. Cl. ........................................ 345/5; 345/619
(58) Field of Search ............................ 345/5, 629, 630, 345/632, 634, 635, 636, 641, 502, 532, 536, 345/764, 810, 619, 620, 597, 623; 353/25; 358/1.16, 1.17; 709/224; 222/192, 638

(56) References Cited

U.S. PATENT DOCUMENTS

| | | | | |
|---|---|---|---|---|
| 5,291,190 A | * | 3/1994 | Scarola et al. .............. | 340/825 |
| 5,570,325 A | * | 10/1996 | Arpadi ......................... | 368/10 |
| 5,572,648 A | * | 11/1996 | Bibayan ....................... | 345/825 |
| 5,811,926 A | * | 9/1998 | Novich ......................... | 313/495 |
| 5,841,434 A | * | 11/1998 | Arda et al. .................. | 345/804 |
| 5,898,430 A | * | 4/1999 | Matsuzawa et al. ........ | 345/302 |
| 6,011,537 A | * | 1/2000 | Slotznick .................... | 345/733 |
| 6,141,001 A | * | 10/2000 | Baleh .......................... | 345/302 |
| 6,160,907 A | * | 12/2000 | Robotham et al. .......... | 382/154 |
| 6,204,840 B1 | * | 3/2001 | Petelycky et al. .......... | 345/302 |
| 6,222,532 B1 | * | 4/2001 | Ceccarelli ................... | 345/328 |
| 6,229,524 B1 | * | 5/2001 | Chernock et al. ........... | 345/157 |
| 6,262,732 B1 | * | 7/2001 | Coleman et al. ............ | 345/835 |
| 6,340,971 B1 | * | 1/2002 | Janse et al. ................. | 715/721 |

* cited by examiner

*Primary Examiner*—Vijay Shankar
*Assistant Examiner*—Nitin Patel

(57) ABSTRACT

An artistic rendering (10) includes first areas (12) for providing a static image and second areas (14) for providing a dynamic image. The artistic rendering may be, for example, a conventional work of art, a game board or other pictoral representation. The static image may be generated as by a painting on a canvas or other conventional medium for generating an image, such as a photograph. The dynamic image may be one or more images or a stream of video display on a flat panel display device, such as an AMLCD, a FED, or an EL display.

15 Claims, 1 Drawing Sheet

METHOD AND APPARATUS FOR DYNAMICALLY PRESENTING A PICTORIAL REPRESENTATION

TECHNICAL FIELD

This invention relates in general to pictoral representations, and more particularly to pictoral representations that have at least a static area and at least a dynamic area.

BACKGROUND

Since the dawn of civilization, mankind has sought to record its deeds, and the surrounding world by making pictoral representations of his observations. Early cave dwellers recorded noteworthy events, such as the passing of seasons, or great success in the hunt, by leaving paintings on the walls of the caves and other dwellings they occupied. Primitive paints were derived from pigments extracted from indigenous plants and animals. These paints were then applied, sometimes in extremely elegant fashion, to the walls of caves by crude brushes fabricated from weeds, tree limbs and bone fragments. Despite the inelegant nature of the paints and brushes, many of these pictoral histories remain, leaving us with a better insight into how ancient man lived.

As mankind progressed, the tools he used to record his surroundings became more sophisticated. The limited palate of pigments derived from nature grew greater as man experimented with other materials. Traditional materials, such as plant matter, were mixed with metal powders, various types of earth and minerals, and other organic materials to create a palate as vibrant and diverse as nature itself. Paints were no longer applied with weeds and sticks. Early brushes were created from the plumes or fur of various animals. These paints were no longer applied to simply cave walls. Mankind learned to fashion stone tablets upon which the paints were applied. Similarly, the bark of different plants, such as papyrus, were worked with different tools and elements to form early papers. Likewise mankind learned to use the skins and hides of animals as a canvas upon which pictures could be painted.

Mankind's knowledge of the arts continued to grow so that over time, paints came to be fashioned from all manner of synthetic materials. These materials yielded not only a rainbow of color, but also other desirable characteristics such as gloss, texture and opacity to name but a few. Both the brushes for applying paint and the medium upon which paint is applied benefited from the revolution in synthetic materials. Conventional synthetic materials are now routinely used to create both brush bristles and the "canvas" upon which pictures are painted.

Innovations in machinery have allowed man to apply paints to huge sheets of paper or canvas moved at ever increasing speeds through printing presses. The quality and uniformity of the printed image resulting from such a process is admirable, and far beyond what the early cave dweller could have ever imaged in his wildest dreams.

However, even a caveman would easily recognize the process that both the highest speed printing press, and the most avante garde artist uses: the application of a pigment to a medium to create a static pictoral representation. Indeed, while the tools for painting have improved and the artist's technique has advanced (arguably) the underlying concepts have remained essentially the same. For example, an artist wishing to paint the sun setting over a mountain can dutifully study her subject, and then produce a faithful representation of that image by applying paint via the brush, to canvas. However, once committed to canvas, that image was fixed for all time. This static image may have been a true representation of how the artist perceived the subject at the moment it was captured, but the painting itself has no capacity for change, so as to expand or evolve capturing the new reality of the image. Many well known artists have tried to deal with this by painting a "series" of images of a given subject, attempting to capture many different representative facets of the subject. Most artists found this technique lacking.

Modern filmmaking techniques allow an artist to capture on film the moving image of a given subject. While this artistic technique allows the representation of change in the subject, it is extremely limiting in terms of allowing an artist to accentuate nuances in the subject. Moreover, filmmaking techniques do not easily accommodate the abstract expression of images.

Accordingly, there exists a need for both a method and an apparatus that allows for representation of artistic images in static and dynamic fashion concurrently. Such a device should not in itself be so large or obtrusive that it in any way distracts from the artistic work.

DETAILED DESCRIPTION OF THE PRFERRED EMBODIMENT

Figure 1:
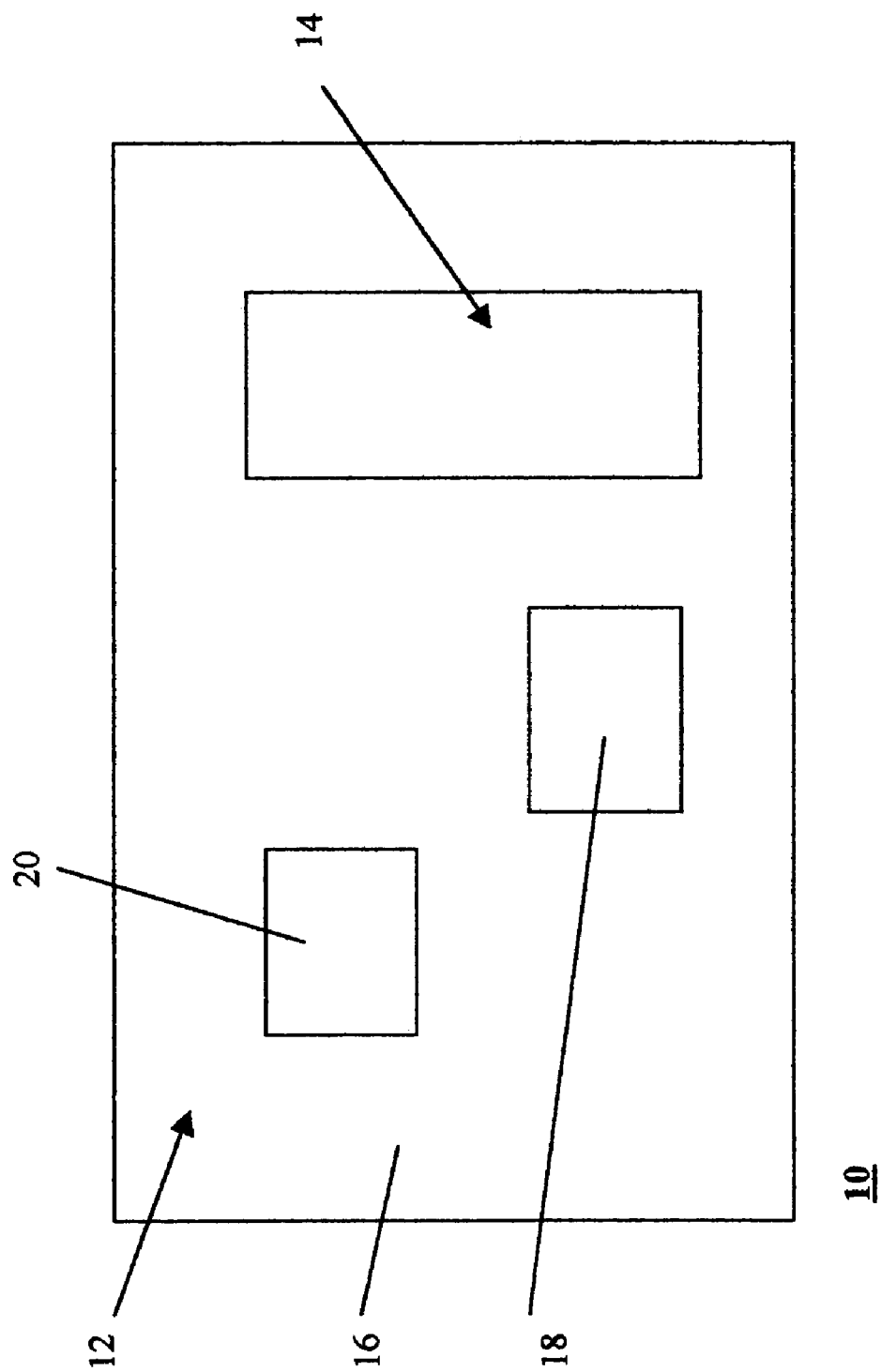
FIG. 1 is a representation of an artistic rendering including a static portion and a dynamic portion, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a representation of an artistic rendering 10 in accordance with the instant invention. The artistic rendering 10 includes at least first static areas or portions 12 and at least second dynamic areas or portions 14. By static it is meant that the portion is an unchanging representation provided by an artisan applying paint, inks,chalks or other color imparting pigments or means to a conventional medium, such as a canvas 16. Static also refers to the fact that once the presentation has been committed to a medium, say a canvas, that presentation does not change. This is not to say however, that the static area cannot be removed and replaced, in a manner described in greater detail herein below.

One or more openings 18, 20 may then be provided in the static portion medium, and into which is provided, for example, a display device for providing the dynamic portion of the rendering. It is to be noted that the dynamic portion need not be limited to a display device for providing the dynamic rendering. Rather, other artistic devices, such as mobiles, holographs, multidimensional image projections, or other mechanical structures may be employed.

It is to be noted that while the rendering 10 may be in the form of a painting, the invention is not so limited. Any type of pictoral representation may be enhanced by the instant invention. Accordingly, the rendering may be, but is not limited to, an artistic work, a photographic image, a game board, an internet site, a photograph, and a print to name but a few. It also to be noted that while the rendering is described as having a static portion and a dynamic portion, it may in fact have any number of static portions and dynamic portions. For example, one can imagine an artistic rendering having a "checkerboard" pattern of static and dynamic portions. Alternatively, a rendering may have a single static portion with a plurality of dynamic portions arranged around the static portion. These and many other permutations are easily imagined.

With respect to the dynamic portion, if a display device is used it should be a relatively light weight, flat display, so as not to substantially intrude on the overall artistic impression of the rendering. Accordingly any one of a number of recently developed flat panel display would likely meet the requirements. Generally, a liquid crystal flat panel device may meet the requirements for the instant invention. Such devices may be either passive or active, and transparent or reflective, each allowing for the provision of differing optical characteristics.

Flat panel display devices are increasingly gaining market acceptance for a variety of different applications. For example, active matrix liquid crystal displays (AMLCD's) have found widespread use as the video monitors in laptop computers, video cameras and avionics navigation modules, to name but a few devices. Other types of display devices such as electroluminescent (EL), plasma displays and field emissive displays (FED's) are also used in a variety of industrial and consumer applications. The advantage of each of these types of devices resides in the fact that they are all substantially flat, particularly as compared to the cathode ray tube that has been in use for the past fifty years.

In the AMLCD, the elements that cause the device to effect a desired optical characteristic are typically sandwiched between a pair of thin glass plates. These elements include first and second patterned electrodes for applying an electrical field to liquid crystal (LC) material disposed therebetween. Each pair of oppositely disposed patterned electrodes defines a single picture element or pixel. The liquid crystal material typically is a conventionally known liquid crystal material, such as cholesteric, polymer dispersed liquid crystal materials, twisted nematic (TN), supertwist nematic (STN), chiral smectic and others. The application of an electrical field to the LC material causes it to change its orientation from a first condition to a second condition, for example, transparent to opaque. However, in order to control the orientation of the liquid crystals, it is necessary to provide numerous other optical elements, such as at least a pair of polarizers, and a plurality of alignment layers. A conventional AMLCD is fully described in, for example, U.S. Pat. Nos. 4,666,252, 4,715,685 and 5,061,040 all to Yaniv, et al., the disclosures of which are incorporated herein by reference. Any one of the types of displays described herein, or indeed any other type of flat panel display, may be advantageously employed in the instant invention.

In operation, combining a static artistic expression created by an artist with a dynamic expression displayed on the display device creates the artistic rendering. By dynamic it is meant that the image on the dynamic portion or display does not stay the same, but rather is moving or changing over time. In particular, one or more video images, or indeed a video stream, may be provided on the dynamic portion. The artistic rendering display on the dynamic portion is then combined with the static portion to create the overall artistic rendering. In the context in which the rendering is something other that a true "work of art", such as a game board, it may be appreciated that the value or significance of certain board positions depicted by the dynamic portion will change as the dynamic portion changes, thus introducing an element of chance into the conventional board game. One may easily appreciate other situations that would benefit by adding a dynamic element to the conventional static representation.

As noted above, even the static portion may be changed. For example, in the context of a game board, the static portion may be replaced by different static gameboards, each interacting independently with the dynamic portion. Accordingly, an apparatus incorporating both the static portions and dynamic portions, may further include input/output ports for coupling to a computer. Such an apparatus would then be able to determine the specific static portion inserted, and generate dynamic images from a computer memory, appropriate to that static image. Alternatively, the apparatus may be coupled, either through a computer or directly, to an internet site which provides, for example downloadable static images and video streams for the dynamic regions.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An apparatus for providing a pictoral representation, comprising:
   on a first media at least one static presentation region for providing at least a first, unchanging pictoral rendering, said first media having at least one opening formed therethrough;
   on a second media, different than said first media, a dynamically changing presentation region, said dynamically changing presentation region providing at least a first series of changing renderings, said first series of changing renderings being unrelated to the content of the first, unchanging pictoral rendering; and
   wherein said second media is positioned in the opening formed through said first media.

2. An apparatus as in claim 1, wherein said representation comprises a plurality of static presentation regions.

3. An apparatus as in claim 1, wherein said representation comprises a plurality of dynamic presentation regions.

4. An apparatus as in claim 1, wherein said dynamic presentation regions is provided on a flat panel display device.

5. An apparatus as in claim 4, wherein said flat panel devise is a liquid crystal display device.

6. An apparatus as in claim 5, wherein said liquid crystal display device is selected from the group of transmissive devices, reflective devices, passive devices, and combinations thereof.

7. An apparatus as in claim 4, wherein said flat panel device is an FED.

8. An apparatus as in claim 4, wherein said flat panel device is an EL display device.

9. An apparatus as in claim 4, wherein said flat panel device is a plasma display.

10. An apparatus as in claim 4, wherein said pictoral representation is an artistic rendering.

11. An apparatus as in claim 1, wherein said dynamic presentation region is a mechanical structure.

12. An apparatus as in claim 1, wherein said dynamic presentation region is a projected image.

13. An apparatus as in claim 1, wherein said dynamic presentation region is a holograph.

14. An apparatus as in claim 1, further including input/output means for coupling said apparatus to a computer.

15. An apparatus as in claim 1, further comprising memory means for storing information to be presented in said dynamic presentation regions.

* * * * *